INVENTORS
WILLIAM F. FUHRMEISTER
ROGER P. GENTILE
GORDON W. RIEDEL
BY
AGENT

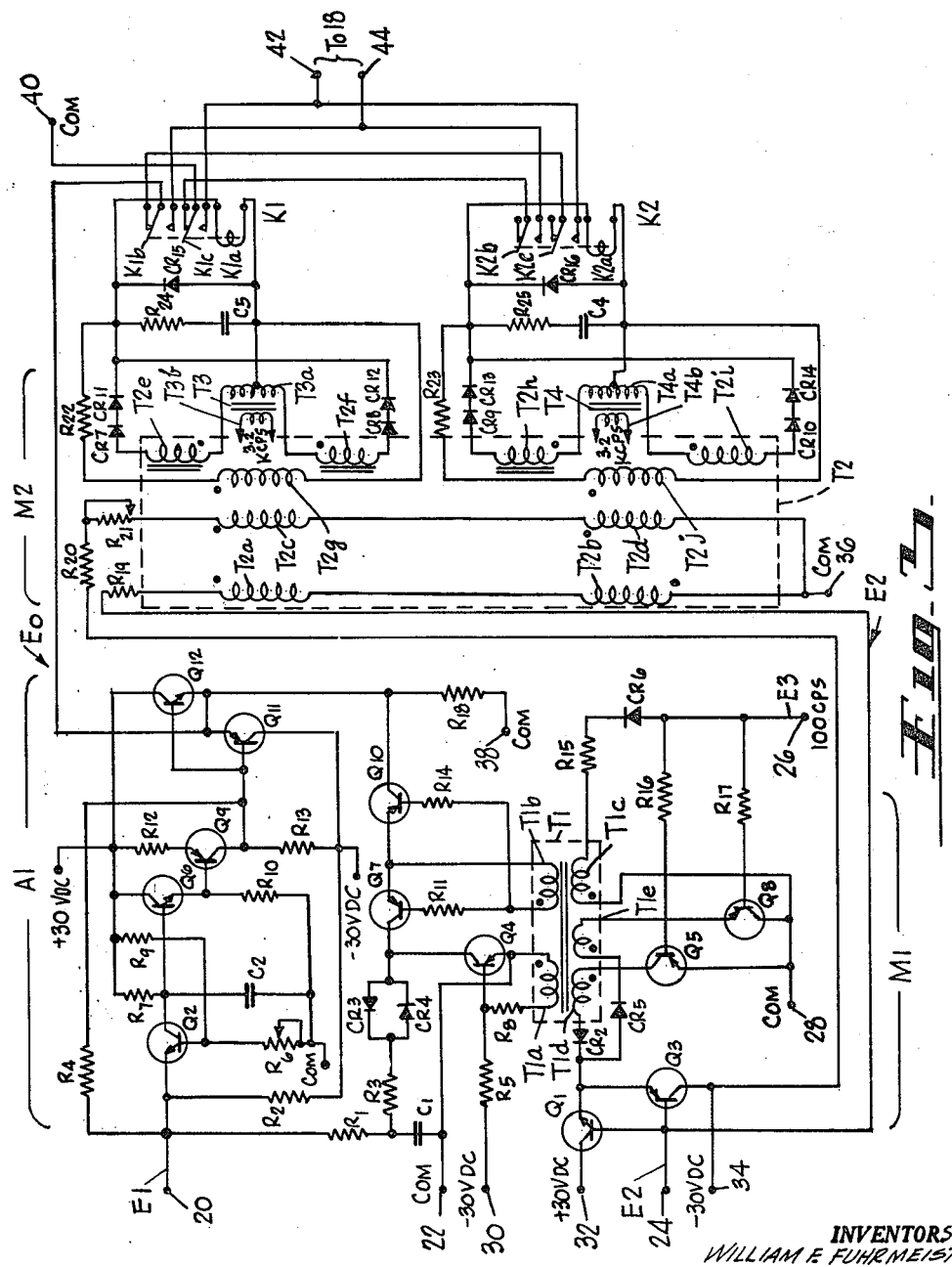

United States Patent Office 3,141,638
Patented July 21, 1964

3,141,638
ANALOG DIVISION CONTROL SYSTEM
William F. Fuhrmeister, Dallas, Tex., and Roger P. Gentile, Santa Monica, and Gordon W. Riedel, Pacific Palisades, Calif., assignors to Douglas Aircraft Company, Inc., Santa Monica, Calif.
Filed July 17, 1962, Ser. No. 210,407
17 Claims. (Cl. 244—77)

This invention relates generally to control systems for missiles and aircraft, and more particularly to a bank angle control system including a novel analog division circuit.

A bank angle control system is used to bank-angle stabilize a missile or aircraft so as to improve the performance of the missile or aircraft. The usual function of a bank angle control system is to orient the missile or aircraft continuously to a bank angle at which the most favorable steering characteristics exist for the missile or aircraft. As is well known, the maneuvering capability of aircraft, for example, is greatest in a plane perpendicular to the plane of the wings. In order to obtain best maneuvering performance of an aircraft, the wings are maintained in a plane normal to the maneuver plane of the aircraft. Thus, airplanes bank to turn because a larger or sharper maneuver normal to the plane of the wings is possible, as well as being more pleasant in sensation to the occupants of the airplane.

Bank angle can be defined as the angle between a fixed roll reference surface or structure of a missile or aircraft and the normal acceleration vector resulting fom a maneuver of the missile or aircraft. The normal acceleration vector, of course, refers to the acceleration perpendicular to the longitudinal axis of the missile or aircraft. Since bank angle is associated with normal acceleration, it will be shown that a quadrate pair of accelerometers placed in a plane normal to the longitudinal axis of the missile or aircraft and properly aligned with respect to the roll reference surface can provide signals necessary to establish bank angle control. Further, by suitably operating upon these signals, a control signal is obtained which is proportional to the bank angle and independent of the amplitude of the normal acceleration.

It can be shown that the corectional signal or acceleration $A_0$ required for controlling roll of the missile or aircraft through a bank angle B so that the normal acceleration vector $A_n$ becomes properly aligned with a reference control surface, is equal to the product of the normal acceleration vector and the sine of the bank angle, or $A_n \cdot \sin B$. When the bank angle through which the missile or aircraft must be rolled in order to align the reference control surface with the normal acceleration vector is small; for example, 10 degrees or less, sin B is closely approximated by the bank angle B itself. That is, sin $B \cong B$ and $A_0 \cong A_n \cdot B$, where $A_0$ and $A_n$ are given in gravity units and B in radians. This relationship is adequately accurate for use in establishing aerodynamic control for bank angles to approximately 30 degrees.

The normal acceleration vector $A_n$, however, varies in magnitude over a relatively wide range timewise during flight of the missile or aircraft. The result is that for any particular bank angle through which the missile or aircraft is to be rolled and a particular threshold for system response, gain is variable with time and a control system which is responsive to the quantity $A_n \cdot B$ for bank-angle stabilization, has undesirable frequency response characteristics. Further, it is difficult to obtain accurate signals directly representative of the normal acceleration vector $A_n$ and the bank angle B with a minimum of measuring equipment for immediate utilization by a control system of ordinary complexity.

It is an object of this invention to provide a bank angle control system which has desirable response characteristics for bank-angle stabilization of a missile or aircraft, irrespective of variations of the normal acceleration vector associated with missile or aircraft movement in yaw and pitch directions, for example.

Another object of the invention is to provide a bank angle control system which utilizes signals representing measurements that are easily and directly obtained with simple and conventional sensing devices.

A further object of this invention is to provide a bank angle control system which operates accurately in response to acceleration measurement signals.

A still further object of the invention is to provide in a bank angle control system, circuit means including an analog division circuit for operating on a pair of acceleration signals to produce a control signal which is independent of the normal acceleration vector associated with missile or aircraft movement.

Briefly, and in general terms, the foregoing and other objects are preferably accomplished by providing a bank angle control system comprising a combination of a pair of accelerometers, an analog division circuit receiving the output signals of the accelerometers to produce a suitable control signal of a polarity dependent upon the polarity of the output signal from one of the accelerometers, a polarity sensing circuit having the control signal from the division circuit and the output signal from the other accelerometer provided thereto, the polarity sensing circuit being energized in one of two modes according to the polarity of the output signal of the other accelerometer, and servo control means which is responsively energized by the output signal from the polarity sensing circuit to actuate control surfaces which roll the missile or aircraft in a clockwise or counterclockwise direction according to the polarity of the roll signal, the roll signal being applied to the servo control means in one polarity sense when the polarity sensing circuit is energized in one mode, and in a reversed polarity sense when it is energized in the other mode.

The analog division circuit generally comprises a combination of a high gain amplifier, a pair of switching transistors and an integrating network connected in a feedback loop of the high gain amplifier, and a magnetic amplifier for controlling the switching transistors in a manner to vary the feedback factor of the high gain amplifier. One accelerometer output signal is applied to the input of the high gain amplifier and the other accelerometer output signal is applied to the input of the magnetic amplifier. Pulse width modulation at a suitable gate frequency is performed wherein periodic output pulses of the magnetic amplifier are produced to cyclically saturate the switching transistors in the feedback loop of the high gain amplifier so that the output voltage thereof is sampled during one half of each cycle of the gate frequency and the magnetic amplifier is reset proportionally to the magnitude of the accelerometer output signal applied thereto during the other half of each cycle. Since the amount of reset is proportional to the magnitude of the accelerometer output signal applied to the magnetic amplifier, the output pulse therefrom will have a pulse width proportional to the magnitude of the applied accelerometer output signal. The switching transistors are thus saturated over a part of each sampling half cycle for a time increment which is proportional to the magnitude of the accelerometer output signal applied to the magnetic amplifier. In this manner, the feedback factor of the high gain amplifier is varied in proportion to the magnitude of the accelerometer output signal applied to the magnetic amplifier, and a suitable output or control signal which is proportional to the ratio of the two accelerometer output signals respectively applied to the high gain amplifier and the magnetic amplifier, is produced by the division circuit for application to the polarity sensing circuit of the bank angle control system.

The invention will be more fully understood, and other objects and advantages thereof will become apparent, from the following description of an illustrative example of the invention to be taken in conjunction with the accompanying drawings, in which:

FIGURE 3 is a preferred embodiment of the division circuit and polarity sensing circuit shown in the block diagram of FIGURE 1.

Figure 1:
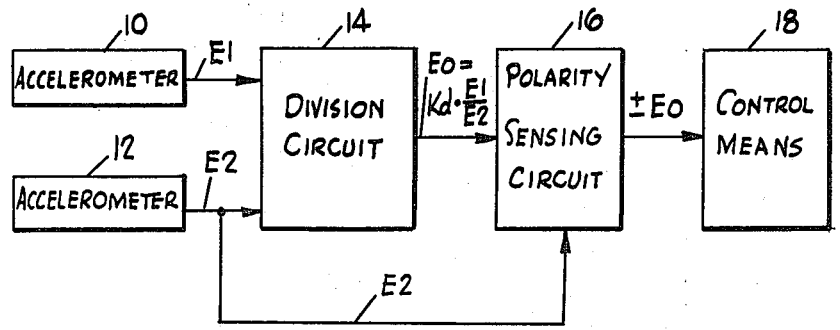
FIGURE 1 is a block diagram of a bank angle control system according to this invention.

A block diagram of the bank angle control system for a missile is shown in FIGURE 1. A conventional accelerometer 10 provides an output signal E1 which is proportional in magnitude to $A_n \cdot \sin B$ and and another similar accelerometer 12 provides another output signal E2 which is proportional in magnitude to $A_n \cdot \cos B$, where $A_n$ is the acceleration in gravity units in a direction normal to the longitudinal axis of the missile and B is the bank angle in radians through which the missile must be rolled to align a reference control surface or structure with the direction of the normal acceleration on the missile.

The two signals E1 and E2 are analog signals which are applied to analog division circuit 14 to produce an output signal $E_0$ that is equal to the ratio of the two input signals E1 and E2 multiplied by a constant $Kd$. This output signal $E_0$ is applied to polarity sensing circuit 16 which also has the signal E2 from the accelerometer 12 applied thereto. The polarity sensing circuit 16 is responsive to the polarity of the signal E2 and is energized in one of two modes according to the polarity of the signal E2. Since the signal E2 is proportional to $A_n \cdot \cos B$ and cos B is approximately unit for small bank angles, the polarity sensing circuit 16 is effectively responsive to the polarity of the normal acceleration vector $A_n$ for such angles.

The polarity of the output signal $E_0$ is, of course, dependent upon the polarities of the input signals E1 and E2 to the division circuit 14. The signal E1 is proportional to $A_n \cdot \sin B$ and for small bank angles sin B is approximately equal to B in radians, so that the signal E1 is proportional to $A_n \cdot B$. Since $E_0$ is proportional to $E1/E2$, the output signal is proportional to $A_n \cdot B/A_n$ or $B$. The polarity of $E_0$ is thus dependent essentially on the polarity of the bank angle B. The polarity of the bank angle B is considered positive for clockwise movement of tthe reference control surface to align it with the normal acceleration vector $A_n$, and negative for counterclockwise alignment movement, for example.

The output signal $E_0$ from the division circuit 14 will be of a polarity determined by the polarity of the bank angle B. This signal $E_0$, of a particular polarity, is applied to control means 18 in one polarity sense or the other according to the mode in which the polarity sensing circuit 16 is energized. As described above, the polarity sensing circuit 16 is energized in one of two modes according to the polarity of the signal E2 which is determined by the polarity of the normal acceleration vector $A_n$. Thus, a control signal is applied to the control means 18 with the proper polarity consistent with normal acceleration and bank angle polarities.

The control means 18 is responsive to the control signal $E_0$ to roll the missile through a bank angle B such that the reference control surface is aligned with the normal acceleration vector $A_n$. The missile is bank-angle stabilized in this condition. The control means 18 includes the roll control system of a conventional autopilot or steering control system, and the control fins are suitably adjusted by servo control means operating in response to the magnitude and polarity of the signal $E_0$ applied thereto. In another version, the control means 18 includes a pair of control jets which are energized respectively according to the polarity of the signal $E_0$, to roll the missile in a clockwise or counterclockwise direction. Two hot gas reaction jets are normally used wherein thrust valves are adjusted by servo control means to vary thrust in accordance with the magnitude of the signal $E_0$.

Figure 2:
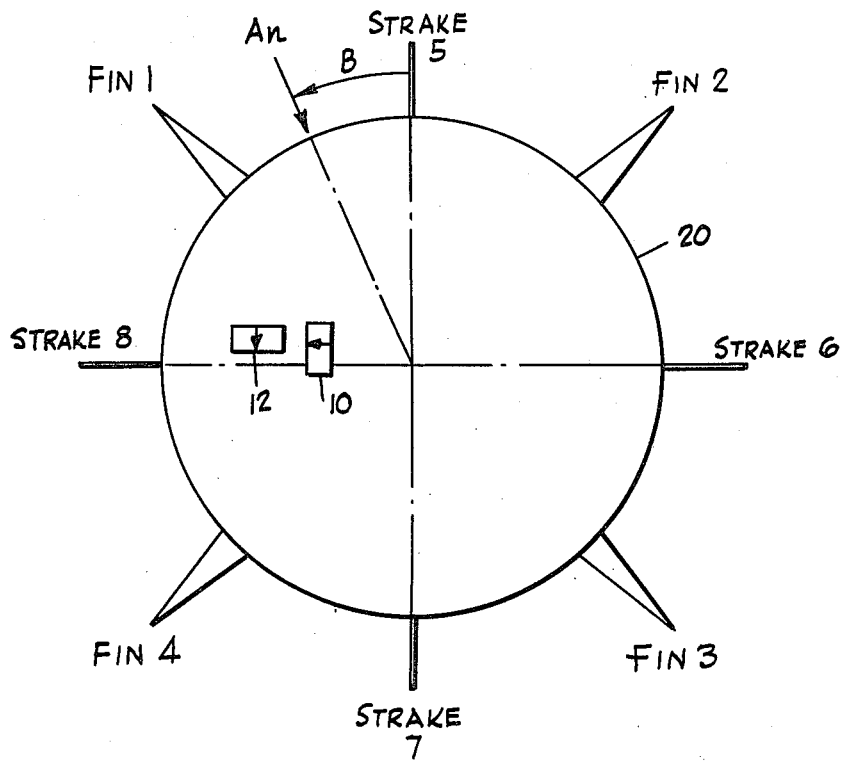
FIGURE 2 is a diagrammatic view of a missile looking forward wherein the missile is oriented in a stable flight attitude.

In the diagrammatic view looking forward of a missile 20 in FIGURE 2, the accelerometers 10 and 12 are depicted in their correct positions for sensing the values $A_n \cdot \sin B$ and $A_n \cdot \cos B$, respectively. The small arrows in the accelerometers 10 and 12 shown in FIGURE 2 indicate the sensitive axes of the devices. The sensitive axis of accelerometer 10 is parallel to the diameter connecting strake 6 to strake 8, and the sensitive axis of accelerometer 12 is parallel to the diameter connecting strake 5 to strake 7. The missile 20 normally flies in a stable flight attitude in which strake 5 is up and strake 7 is down, as illustrated in FIGURE 2. However, the missile 20 has an alternate stable flight attitude wherein the strake 7 is up and strake 5 is down. It is possible that the missile 20 may assume either stable flight attitude according to the manner in which the missile is carried and launched from an aircraft, for example.

The normal acceleration vector $A_n$ is shown arbitrarily in FIGURE 2. Strake 5 is up and is the reference control surface which must be aligned with the direction of the normal acceleration vector $A_n$ for stabilized flight. As indicated in FIGURE 2, the missile 20 must be rolled in a counterclockwise direction through the bank angle B in order to align the reference control surface, strake 5 in this instance, with the direction of the normal acceleration vector $A_n$. When the missile 20 is flown with strake 5 generally up, the accelerometers 10 and 12 are positioned so that a positive output signal E1 is produced from the accelerometer 10 and a negative output signal E2 is produced from the accelerometer 12 to effect missile roll movement through a counterclockwise bank angle B as indicated in FIGURE 2. The polarity of the output signal from the accelerometer 10 is negative, however, with that from the accelerometer 12 remaining negative, to effect roll movement through a clockwise bank angle B.

When the missile 20 is being flown with strake 7 generally up, the accelerometers 10 and 12 both produce positive output signals E1 and E2, respectively, for effecting roll movement of the missile through a clockwise bank angle B to align the strake 7 with the normal acceleration vector $A_n$. The output signal E1 is negative with E2 remaining positive in such instance for effecting roll movement of the missile 20 through a counterclockwise bank angle B in aligning strake 7 with the normal acceleration vector $A_n$.

With either strake 5 or strake 7 generally up and in any particular bank angle orientation relative to the normal acceleration vector, the missile 20 is rolled in the same direction to align strake 5 or strake 7 with the normal acceleration vector. For example, in FIGURE 2, with the normal acceleration vector $A_n$ shown, a counterclockwise bank angle B is effected whether strake 5 or strake 7 is up. Thus, the output signal $E_0$ is applied to the control means 18 (FIGURE 1) in one polarity, which is the same whether strake 5 or strake 7 is up, to roll the missile 20 through a clockwise bank angle B, and applied in another polarity to roll it through a counterclockwise bank angle. The signal $E_0$, for example, may be applied positively to the control means 18 to roll the missile 20 through a clockwise bank angle B, and applied negatively thereto to roll the missile through a counterclockwise bank angle.

It is to be noted, of course, that the control system acts to hold the missile 20 such that the reference control surface is maintained closely aligned with the normal acceleration vector $A_n$ at all times, and the missile is not rolled noticeably in any oscillatory or other motion.

There is, however, a lag in the system which is not actually reflected in any detectable movement of the missile 20 and is due to the adjustment of the polarity sensing circuit 16 such that it does not pass the output signal $E_0$ from the division circuit 14 to the control means 18 until the normal acceleration vector $A_n$ reaches a predetermined value sufficient to affect bank-angle stability of the missile and to produce signals which can establish bank angle polarity or roll direction to align the reference control surface with the normal acceleration vector $A_n$. This value is, for example, less than approximately $.1g$.

The accelerometers 10 and 12 are preferably conventional force balance type accelerometers manufactured by Palomar Scientific Company of Palo Alto, California. These accelerometers 10 and 12 provide signals E1 and E2, respectively, which are voltages that may be positive or negative as described above. The voltage E1 is applied between terminals 20 and 22, and the vltoage E2 is applied between terminals 24 and 22 as indicated in FIGURE 3. The terminal 22 is a common terminal which may be connected to ground. When the missile 20 is flying with strake 5 generally up, the voltage E1 may be positive or negative but the voltage E2 is always negative for counterclockwise or clockwise bank angles, for the normal acceleration vector $A_n$ and arrangement of accelerometers 10 and 12 shown in FIGURE 2.

The voltage E1 is applied to the division circuit 14 and the voltage E2 is applied to the division circuit 14 and the polarity sensing circuit 16. The division circuit 14 and the polarity sensing circuit 16 are shown in detail in FIGURE 3. The division circuit 14 comprises a high gain amplifier A1 generally including transistors Q2, Q6, Q9, Q11 and Q12, and a magnetic amplifier M1 generally including saturable reactor T1 and transistors Q1, Q3, Q5 and Q8. The high gain amplifier A1 has a feedback loop generally including bipolar transistors Q4, Q7, and Q10. The transistors Q7 and Q10 are switching transistors which are saturated cyclically with the frequency of a signal E3 applied between terminals 26 and 28 in a pulse width modulation method for varying the feedback factor of the high gain amplifier A1 so as to divide the two analog voltages E1 and E2 applied to the division circuit 14. The signal E3 is, for example, a 100 c.p.s. square wave voltage. The terminal 28 is a common ground potential connection like the terminal 22. All terminals in FIGURE 3 labeled as a common terminal are preferably ground potential connections.

The transistors Q2, Q6, Q9, Q11 and Q12 are connected in a high gain amplifier arrangement wherein the transistor Q2 is connected in a common base circuit configuration which presents a low input impedance for the high gain amplifier. The input terminal 20 is connected to the emitter of the transistor Q2 such that terminal 20 is essentially a signal ground because of the low input impedance configuration. Terminal 20 is always at or very near to ground potential, and voltage E1 results in an input signal which is a current at terminal 20 to the transsistor Q2. The emitter of the transistor Q2 is adjusted to ground potential by potentiometer R6, and an output voltage $E_0$ is produced at the emitters of the transistors Q11 and Q12. The primary function of potentiometer R6 is to adjust the quiescent value of the output voltage $E_0$ to zero. The circuit is designed so that the emitter potential of transistor Q2 is substintially at ground potential when the output is zero, as the output should be during quiescence when the accelerometers 10 and 12 do not produce any output signals. The voltage $E_0$ is positive when the transistor Q12 conducts, and negative when the transistor Q11 conducts. It is seen from FIGURE 3 that when E1 is positive, only the transistor Q11 conducts, and when E1 is negative, only the transistor Q12 conducts.

A resistor R4 is connected from the bases of the transistors Q11 and Q12 to terminal 20 to provide negative feedback from the bases of the transistors Q11 and Q12 to the emitter of transistor Q2. The introduction of negative feedback in the circuit reduces the closed loop gain, improves the linearity, reduces drift, and improves the stability of amplifier A1. Since terminal 20 is always essentially at ground potential, voltage E1 does not appear at the bases of the transistors Q11 and Q12 through the feedback resistor R4.

The high gain amplifier A1 is an inverting circuit which produces a negative output voltage $E_0$ when the input voltage E1 is positive, and a positive output voltage when the input voltage is negative. The output voltage $E_0$ is algebraically combined with the input voltage E1 through a feedback loop including the switching transistors Q7 and Q10, blocking diodes CR3 and CR4 which are connected in parallel and in oppositely conducting directions, and an integrating network including series resistors R1 and R3, and shunt capacitor C1 connecting the common junction of the series resistors to ground. With the feedback loop closed, the magnitude and polarity of the output signal $E_0$ will depend upon the magnitude and polarity of the input voltage E1 and the feedback factor of the feedback loop.

The transistors Q11 and Q12 provide a low output impedance for the high gain amplifier A1, and the function of the diodes CR3 and CR4 is to provide a voltage deadband larger than the saturated collector to emitter voltage of transistor Q4. This is critical for the case where E1 is zero. The collector of transistor Q4 is connected to the anode of diode CR3, the cathode of diode CR4 and to the collector of transistor Q7, and the emitter is connected to common terminal 22. The base of the transistor Q4 is connected to terminal 30 through resistor R5 as shown in FIGURE 3. A negative voltage of, for example, $-30$ volts is applied to the terminal 30.

The base of the transistor Q4 is also connected to one end of output winding T1a of the saturable reactor T1 through a resistor R8. Similarly, the bases of the transistors Q7 and Q10 are connected to one end of output winding T1b through resistors R11 and R14 respectively, and the emitters of the transistors Q7 and Q10 are both connected to the other end of the output winding T1b. The output windings T1a and T1b respectively control conduction of the transistor Q4, and transistors Q7 and Q10.

The reference modulating voltage E3 on the terminal 26 is applied to gate winding T1c of the saturable reactor T1 through series connected diode CR6 and resistor R15. The voltage E3 is also applied to the bases of transistors Q5 and Q8 through respective resistors R16 and R17. The emitter of the transistor Q5 and the collector of the transistor Q8 are connected to common terminal 28, and the collector of Q5 is connected to one end of reset winding T1d while the emitter of Q8 is connected to one end of reset winding T1e. The other end of reset winding T1d is connected to the emitters of transistors Q1 and Q3 through a diode CR2, and the other end of reset winding T1e is connected to the emitters of these transistors Q1 and Q3 through another diode CR5. The diodes CR2 and CR5 are connected in opposite orientations to the emitters of transistors Q1 and Q3 as shown in FIGURE 3.

The collector of the transistor Q1 is connected to terminal 32 to which is applied $+30$ volts, and the collector of the transistor Q3 is connected to terminal 34 to which is applied $-30$ volts. The bases of the transistors Q1 and Q3 are connected to terminal 24 to which is applied the voltage E2. This voltage E2 is also applied through resistor R19 to the series connected control windings T2a and T2b of a double section saturable reactor T2 of a magnetic amplifier M2 which is a major component of the polarity sensing circuit 16. The two sections are identical except for opposite polarity connections of the series control coils T2a and T2b. The common terminal 36 can be grounded and is the return connection for the series control windings T2a and T2b.

The −30 volts on terminal 34 is similarly applied to series connected bias windings T2c and T2d through series connected resistors R20 and R21 to common terminal 36. The resistor R21 is adjustable and is used to set the threshold response level of the magnetic amplifier M2 to the signal E2. That is, the setting of resistor R21 adjusts the necessary magnitude required of voltage E2, and hence the magnitude of the normal acceleration vector $A_n$ (for small bank angles), before an output signal is produced to actuate either relay K1 or K2. The setting of resistor R21 is such that one of the relays K1 or K2 is actuated when the magnitude of E2 corresponds to approximately .1g, for example.

Gate winding T2e is connected on one end to the upper end of the control coil K1a of relay K1 through two series connected diodes CR7 and CR11, and the other end of the gate winding T2e is connected to one end of the center tapped secondary winding T3a of an ordinary transformer T3. Similarly, one end of the gate winding T2f is connected to the upper end of the control coil K1a of relay K1 through two series connected diodes CR8 and CR12, and the other end of the gate winding T2f is connected to the other end of the secondary winding T3a of the transformer T3. The center tap of the secondary winding T3a is connected to the lower end of the control coil K1a of the relay K1. An alternating signal is applied to the primary winding T3b of the transformer. The signal is, for example, a 3.2K c.p.s. square wave signal. A feedback winding T2g is connected across the control coil K1a of the relay K1 in series with resistor R22.

The upper end of the control coil K2a of relay K2 is connected to one end of gate winding T2h through two series connected diodes CR9 and CR13, the other end of the gate winding T2h being connected to one end of the center tapped secondary winding T4a of an ordinary transformer T4. Similarly, one end of gate winding T2i is connected to the upper end of the control coil K2a through two series connected diodes CR10 and CR14, and the other end of the gate winding T2i is connected to the other end of the secondary winding T4a of the transformer T4. The center tap of the secondary winding T4a is connected to the lower end of the control coil K2a of the relay K2. An alternating signal which may be the same 3.2K c.p.s. square wave signal applied to winding T3b of transformer T3 is applied to the primary winding T4b of the transformer T4. A feedback winding T2j is connected across the control coil K2a of the relay K2 in series with resistor R23.

The relays K1 and K2 are double pole, double throw relays. The output voltage $E_0$, as developed across resistor R18 which may be grounded on the common terminal 38, is applied to the collector of the transistor Q10 of the feedback loop of the high gain amplifier A1 and to the upper pole K1b of the relay K1. The lower pole K1c of the relay K1 is connected to common terminal 40 which may be grounded. As can be seen in FIGURE 3, the upper contact of the lower pole K1c is connected to the upper pole K2b of relay K2, and the upper contact of pole K1b is connected to the lower pole K2c of the relay K2. The lower contacts of poles K1c and K2c are connected to terminal 42 and the lower contacts of poles K1b and K2b are connected to terminal 44 of the control means 18. From the indicated polarities of the windings of the saturable reactor T2, the relay K1 is energized when voltage E2 is negative, and relay K2 is energized when voltage E2 is positive.

Operation of the system will be described for the condition illustrated in FIGURE 2. Strake 5 is up and the missile 20 must be rolled in a counterclockwise direction through bank angle B in order to align the strake 5 with the normal acceleration vector $A_n$. With the arrangement of the accelerometers 10 and 12 as shown in FIGURE 2, the accelerometer 10 produces a positive output voltage E1 which is applied to terminal 20 of FIGURE 3, and the accelerometer 12 produces a negative output voltage E2 which is applied to the terminal 24. It is assumed that the control means 18 is connected and arranged such that the missile 20 is rolled in a counterclockwise direction when terminal 42 is positive with respect to terminal 44, and the missile 20 is rolled in a clockwise direction when the terminal 42 is negative with respect to terminal 44 in FIGURE 3.

The reference voltage E3 has been described as a square wave having a modulating frequency which is applied to gate winding T1c. The square wave is preferably symmetrical having a period of $t1$ second. The output windings T1a and T1b of the saturable reactor T1 are energized by voltage E3 on the positive portion of each cycle but not during the negative portion because of the diode CR6. During the negative portion of each cycle of voltage E3, the transistors Q5 and Q8 are rendered conducting and either reset winding T1d or T1e is energized according to the polarity of the voltage E2.

When voltage E2 is positive, the transistor Q1 is energized so that the +30 volts on terminal 32 is passed through the diode CR5 and transistor Q8 to energize the reset winding T1e. The diode CR2 blocks the +30 volts from the reset winding T1d. When voltage E2 is negative, the transistor Q3 is energized so that the −30 volts on terminal 34 is applied through the diode CR2 and transistor Q5 to energize the reset winding T1d. The diode CR5 then blocks the −30 volts from reset winding T1e. The conductivity of the transistors Q1 and Q3 is dependent upon the magnitude of the voltage E2, and the core of the saturable reactor T1 is thus reset an amount which is proportional to E2.

This can be expressed as $$D = \frac{E2 \cdot (t1)/2 \cdot 10^8}{A \cdot N1} \qquad \text{Eq. 1}$$

where $D$ = Reset flux density (gauss)
$(t1)/2$ = Half period of modulating signal E3
$A$ = Effective cross sectional area of core
$N1$ = Number of control turns
$E2$ = Divisor (volts)

During the positive half cycle of the modulating signal E3, the gate winding T1c supports the voltage for a given time $t2$. The voltage from output winding T1b saturates the switching transistors Q7 and Q10, thus closing the feedback loop for this time $t2$. The polarity of the output winding T1a is such that the transistor Q4 is turned off during the positive half cycle of E3 for the time $t2$. With a positive voltage E1, conduction of transistor Q2 is reduced, causing transistor Q6 to increase conduction and transistor Q9 to conduct less to produce a negative voltage on the bases of the transistors Q11 and Q12. The transistor Q11 is energized to provide a negative output voltage $E_0$. This negative voltage $E_0$ is fed back through the saturated transistors Q7 and Q10, and integrated by the network including the resistors R1 and R3, and the capacitor C1, to be applied to the input of the high gain amplifier A1. The R–C network in the feedback path integrates pulses from the transistors Q7 and Q10 and feeds the average current to the input of the high gain amplifier.

The feedback loop is closed for a given time $t2$ wherein $$t2 = \frac{DA(N2) \cdot 10^{-8}}{E3} \qquad \text{Eq. 2}$$

where $D$ = Reset flux density
$N2$ = Number of gate turns
$E3$ = Modulating voltage
$t2$ = Time switching transistors are turned on.

Combining Eqs. 1 and 2, $$t2 = \frac{E2 \cdot (t1)/2 \cdot 10^8}{A \cdot N1} \cdot \frac{A(N2) \cdot 10^{-8}}{E3} \qquad \text{Eq. 3}$$

and $$\frac{t2}{t1} = \frac{E2 \cdot N2}{2N1 \cdot E3} \qquad \text{Eq. 4}$$

The expression for $t2/t1$ is for that portion of the period of a cycle of the modulating signal E3 frequency during which the switching transistors Q7 and Q10 are saturated, and the transistor Q4 is off. During this portion of the period of a cycle the capacitor C1 is being charged. When the switching transistors Q7 and Q10 are turned off, the transistor Q4 is turned on by the negative voltage provided on its base. Since the emitter of the transistor Q4 is connected to common terminal 22, this provides essentially identical charge and discharge time constants for the R–C filter or integrating network.

The accelerometer 10 is equivalent to a generator producing a generated voltage E1 and having a series resistance R. A current Ig due to the generated voltage E1 is provided into the terminal 20. This current Ig is combined with the feedback current If to produce the input current Ii to the input of the high gain amplifier A1. Thus, $$Ii = Ig + If \qquad \text{Eq. 5}$$

For an inverting feedback amplifier having a gain K and a feedback factor H, $$E_0 = -KIi \qquad \text{Eq. 6}$$

and $$If = H \cdot E_0 \qquad \text{Eq. 7}$$

Combining Eqs. 5 and 7, $$Ii = Ig + H \cdot E_0 \qquad \text{Eq. 8}$$

Since $$Ig = E1/R$$

then, $$Ii = (E1/R) + H \cdot E_0 \qquad \text{Eq. 9}$$

Now combining Eqs. 6 and 9, $$-E_0/K = (E1/R) + H \cdot E_0 \qquad \text{Eq. 10}$$

and solving Eq. 10 for $E_0$, $$-(E_0/K) - H \cdot E_0 = E1/R$$

$$-E_0 \left(\frac{1}{K} + H\right) = E1/R$$

then $$E_0 = \frac{-E1/R}{(1/K) + H} \qquad \text{Eq. 11}$$

Since the R–C network is an integrating network, an essentially direct current output is obtained from the network. In this instance, the capacitor C1 can be neglected in obtaining the feedback factor H from Eq. 4. That is, $$H = \frac{E2 \cdot N2}{(R1 + R3) 2N1 \cdot E3} \qquad \text{Eq. 12}$$

Substituting into Eq. 11, $$E_0 = \frac{-E1/R}{\frac{1}{K} + \frac{E2 \cdot N2}{(R1 + R3) 2N1 \cdot E3}} \qquad \text{Eq. 13}$$

Let $$K_0 = \frac{N2}{(R1 + R3) 2N1 \cdot E3}$$

then $$E_0 = \frac{-E1/R}{\frac{1}{K} + K_0 \cdot E2} \qquad \text{Eq. 14}$$

Since the gain K is large, then $1/K$ is very small and may be neglected. Accordingly, $$E_0 = \frac{E1/R}{-K_0 \cdot E_2}$$

$$E_0 = \frac{1}{-K_0 \cdot R} \cdot \frac{E1}{E2}$$

or $$E_0 = Kd \cdot E1/E2 \qquad \text{Eq. 15}$$

where $Kd = 1/(-K_0 \cdot R)$, a constant.

Thus, the output voltage $E_0$ is proportional to the ratio of the two input voltages E1 and E2.

The negative output voltage $E_0$, for a positive input voltage E1, appears on the pole K1b of the relay K1. Since the voltage E2 is negative, output signals are obtained from gate windings T2e and T2f to energize control coil K1a and actuate the relay K1. The negative voltage $E_0$ on pole K1b is connected to terminal 44 to the control means 18 and returned from terminal 42 to common terminal 40 through actuated pole K1c of relay K1. Thus, the terminal 42 is positive with respect to terminal 44 and the missile 20 is responsively rolled in a counterclockwise direction.

If, now, the input voltage E1 was negative, the output voltage $E_0$ would be positive and the terminal 42 becomes negative with respect to terminal 44 so that, with the voltage E2 remaining negative to actuate the relay K1, the missile is rolled in a clockwise direction.

When strake 7 is up, the output of accelerometer 12 is positive and a positive voltage E2 will actuate the relay K2 for the polarities of the windings of the saturable reactor T2 indicated in FIGURE 3. If voltage E1 is positive, indicating that the missile 20 is to be rolled in a clockwise direction instead of a counterclockwise direction as with strake 5 up because of the reversed orientations of the accelerometers 10 and 12, a negative output voltage $E_0$ is obtained on pole K1b of relay K1. Since relay K2 is now actuated, the negative voltage $E_0$ is provided through actuated pole K2c of relay K2 to the terminal 42 and returned from terminal 44 of the control means 18 to common terminal 40 through actuated pole K2b of the relay K2. The terminal 42 is therefore negative with respect to terminal 44 and the missile is correctly rolled in a clockwise direction.

Similarly, a negative voltage E1 with strake 7 up requires a counterclockwise roll response of the missile 20. The output voltage $E_0$ is positive in this instance so that the terminal 42 is positive with respect to the terminal 44 with the relay K2 actuated, and the missile 20 is correctly rolled in a counterclockwise direction.

While one embodiment of the invention has been described, it is to be understood that the particular embodiment described above and shown in the drawings is merely illustrative of and not restrictive on the broad invention, and that various changes in design, structure and arrangement may be made without departing from the spirit and scope of the appended claims.

What is claimed is:

1. A control system, comprising:
    a first accelerometer mounted to a vehicle for sensing acceleration of said vehicle in a first direction and generating a first analog signal which is characteristically variable according to said sensed acceleration of said vehicle in said first direction;
    a second accelerometer mounted to said vehicle for sensing acceleration of said vehicle in a second direction and generating a second analog signal which is characteristically variable according to said sensed acceleration of said vehicle in said second direction;
    an analog division circuit for dividing said first analog signal by said second analog signal to produce an output analog signal which is characteristically variable according to a ratio of said first analog signal to said second analog signal; and
    control means responsive to said output analog signal for controlling said vehicle whereby said vehicle is oriented to reduce said first analog signal to zero.

2. A control system, comprising:
    a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal;
a polarity sensing circuit responsively energized in a first mode of operation when said second analog signal is of a first polarity and in a second mode when said second analog signal is of a second polarity; and
control means having said output analog signal applied thereto by said polarity sensing circuit and responsive to said output analog signal for controlling said vehicle whereby said vehicle is oriented to reduce said first analog signal to zero, said output analog signal being applied to said control means in one polarity sense when said polarity sensing circuit is energized in said first mode and in a reversed polarity sense when said polarity sensing circuit is energized in said second mode.

3. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal, said analog division circuit including a high gain amplifier having said first analog signal applied thereto and producing an output analog signal, switching means and an integrating network connected in a feedback loop for said high gain amplifier, and magnetic amplifier means for operating said switching means at a modulating frequency and having said second analog signal applied thereto to close said feedback loop a portion of each cycle and vary feed-back factor of said high gain amplifier according to said second analog signal; and
control means responsive to said output analog signal for controlling said vehicle whereby said vehicle is oriented to reduce said first analog signal to zero.

4. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal, said analog division circuit including a high gain amplifier having said first analog signal applied thereto and producing an output analog signal, switching means and an integrating network connected in a feedback loop for said high gain amplifier, and magnetic amplifier means for operating said switching means at a modulating frequency and having said second analog signal applied thereto to close said feedback loop a portion of each cycle and vary feedback factor of said high gain amplifier according to said second analog signal;
a polarity sensing circuit responsively energized in a first mode of operation when said second analog signal is of a first polarity and in a second mode of operation when said second analog signal is of a second polarity; and
control means having said output analog signal applied thereto by said polarity sensing circuit and responsive to said output analog signal for controlling said vehicle whereby said vehicle is oriented to reduce said first analog signal to zero, said output analog signal being applied to said control means in one polarity sense when said polarity sensing circuit is energized in said first mode and in a reversed polarity sense when said polarity sensing circuit is energized in said second mode.

5. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal;
a polarity sensing circuit responsively energized in a first mode of operation when said second analog signal is of a first polarity and in a second mode of operation when said second analog signal is of a second polarity, said polarity sensing circuit including a magnetic amplifier comprising a double section saturable reactor having one section responsively energized when said second analog signal is of said first polarity and the other section responsively energized when said second analog signal is of said second polarity, and first and second relay means connected respectively to said sections of said saturable reactor to be energized thereby; and
control means having said output analog signal applied thereto by said polarity sensing circuit and responsive to said output analog signal for controlling said vehicle whereby said vehicle is oriented to reduce said first analog signal to zero, said output analog signal being applied by said first relay means to said control means in one polarity sense when said second analog signal is of said first polarity and in a reversed polarity sense when said second analog signal is of said second polarity.

6. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;

an analog division circuit for dividing said first analog signal by said second analog signal to produce an output analog signal which is characteristically variable according to a ratio of said first analog signal to said second analog signal, said analog division circuit including a high gain amplifier having said first analog signal applied thereto and producing an output analog signal, switching means and an integrating network connected in a feedback loop for said high gain amplifier, and magnetic amplifier means for operating said switching means at a modulating frequency and having said second analog signal applied thereto to close said feedback loop a portion of each cycle and vary feedback factor of said high gain amplifier according to said second analog signal;

a polarity sensing circuit responsively energized in a first mode of operation when said second analog signal is of a first polarity and in a second mode of operation when said second analog signal is of a second polarity, said polarity sensing circuit including a magnetic amplifier comprising a double section saturable reactor having one section responsively energized when said second analog signal is of said first polarity and the other section responsively energized when said second analog signal is of said second polarity, and first and second relay means connected respectively to said sections of said saturable reactor to be energized thereby; and control means having said output analog signal applied thereto by said polarity sensing circuit and responsive to said output analog signal for controlling said vehicle whereby said vehicle is oriented to reduce said first analog signal to zero, said output analog signal being applied by said first relay means to said control means in one polarity sense when said second analog signal is of said first polarity and by said second relay means to said control means in a reversed polarity sense when said second analog signal is of said second polarity.

7. An analog division circuit, comprising:
a high gain amplifier including an input adapted to receive a first analog signal, an output for providing an output analog signal, and a feedback loop connecting said output to said input and comprising switching means and an integrating network; and means connected directly to said switching means, and independent of any connection with said output of said amplifier, for operating said switching means at a modulating frequency whereby said switching means is actuated to close said loop a variable portion of each cycle of said modulating frequency, in proportion of a second analog signal applied to said operating means to provide a variable feedback factor for said high gain amplifier, said integrating network providing an averaged output signal to said input of said high gain amplifier from said portions of said output analog signal for combination with said first analog signal at said input.

8. An analog division circuit as defined in claim 7 wherein said feedback loop includes means for providing substantially identical charge and discharge time constants for said integrating network.

9. An analog division circuit as defined in claim 7 wherein said operating means includes a magnetic amplifier comprising a saturable reactor having an output winding connected to energize and actuate said switching means, a gate winding, and a reset winding, means for applying a signal of said modulating frequency to said gate winding to energize the same during one half of each cycle of said modulating signal, and means for energizing said reset winding in proportion to a second analog signal during the other half of each cycle of said modulating signal, whereby said saturable reactor is energized on one half cycle to actuate said switching means a portion of the half cycle according to the amount of reset produced by said second analog signal during the preceding half cycle.

10. An analog division circuit, comprising:
a high gain amplifier including an input adapted to receive a first analog signal, an output for providing an output analog signal, and a feedback loop connecting said output to said input and comprising switching means, an integrating network, and means for providing substantially identical charge and discharge time constants for said integrating network; and means connected directly to said switching means, and independent of any connection with said output of said amplifier, for operating said switching means at a modulating frequency, said operating means including a magnetic amplifier comprising a saturable reactor having an output winding connected to energize and actuate said switching means, a gate winding, and a reset winding, means for applying a signal of said modulating frequency to said gate winding to energize the same during one half of each cycle of said modulating signal, and means for energizing said reset winding in proportion to a second analog signal during the other half of each cycle of said modulating signal, said saturable reactor being energized on one half cycle to actuate said switching means and close said loop a variable portion of each half cycle according to the amount of reset produced by said second analog signal during the preceding half cycle whereby a variable feedback factor is provided for said high gain amplifier and said output analog signal is proportional to a ratio of said first analog signal and said second analog signal.

11. An analog division circuit, comprising:
a high gain amplifier including an input having a low input impedance adapted to receive a first analog signal, an output for providing an output analog signal, and a feedback loop connecting said output to said input and comprising switching means, and an integrating network; and means connected directly to said switching means, and independent of any connection with said output of said amplifier, for operating said switching means at a modulating frequency, said operating means including a magnetic amplifier comprising a saturable reactor having an output winding connected to energize and actuate said switching means, a gate winding, and a reset winding, unidirectional conducting means for applying a signal of said modulating frequency to said gate winding to energize the same during one half of each cycle of said modulating signal, and means for energizing said reset winding in proportion to a second analog signal during the other half of each cycle of said modulating signal, said saturable reactor being energized on one half cycle to actuate said switching means and close said loop a variable portion of each half cycle according to the amount of reset produced by said second analog signal during the preceding half cycle whereby a variable feedback factor is provided for said high gain amplifier and said output analog signal is proportional to a ratio of said first analog signal and said second analog signal.

12. An analog division circuit as defined in claim 11 wherein said integrating network is charged when said switching means is energized and discharged when said switching means is de-energized, and said feeback loop includes means energized when said switching means is de-energized to connect said integrating network in a circuit arrangement whereby substantially identical charge and discharge time constants are obtained for said integrating network.

13. An analog division circuit, comprising:
a high gain amplifier including an input adapted to receive a first analog signal, an output for providing an output analog signal, and a feedback loop connecting said output to said input and comprising a feedback switching transistor, and an R–C integrating network; and means connected directly to said switching means, and independent of any connection with said output of said amplifier, for operating said feedback switching transistor at a modulating frequency, said operating means including a magnetic amplifier comprising a saturable reactor having an output winding connected to energize said switching transistor, a gate winding, and a reset winding, unidirectional conducting means for applying a signal of said modulating frequency to said gate winding to energize the same during one half of each cycle of said modulating signal, and means for energizing said reset winding in proportion to a second analog signal during the other half of each cycle of said modulating signal, whereby said saturable reactor is energized on one half cycle to energize said feedback switching transistor a portion of the half cycle according to the amount of reset produced by said second analog signal during the preceding half cycle.

14. An analog division circuit as defined in claim 13 wherein said high gain amplifier has a low input impedance and one end of said R–C network is connected to said input, said integrating network being charged when said feedback switching transistor is energized and discharged when said switching transistor is de-energized, and said feedback loop includes means energized when said feedback switching transistor is de-energized to connect said integrating network in a circuit arrangement whereby substantially identical charge and discharge time constants are obtained for said integrating network.

15. An analog division circuit as defined in claim 14 wherein said means for connecting said integrating network in a circuit arrangement whereby substantially identical charge and discharge time constants are obtained includes a time constant switching transistor, and said saturable reactor includes another output winding connected to energize said time constant switching transistor when said feedback switching transistor is de-energized.

16. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal, said division circuit comprising a high gain amplifier including an input adapted to receive a first analog signal, an output for providing an output analog signal, and a feedback loop connecting said output to said input and comprising switching means, and an integrating network;
means for operating said switching means at a modulating frequency whereby said switching means is actuated to close said loop a variable portion of each cycle of said modulating frequency in proportion to a second analog signal applied to said operating means to provide a variable feedback factor for said high gain amplifier, said integrating network providing an averaged output signal to said input of said high gain amplifier from said portions of said output analog signal for combination with said first analog signal; and
control means responsive to said output analog signal for controlling said vehicle whereby said vehicle is oriented to reduce said first analog signal to zero.

17. A control system, comprising:
a first accelerometer mounted to a vehicle for sensing acceleration of said vehicle in a first direction and generating a first analog signal which is characteristically variable according to said sensed acceleration of said vehicle in said first direction;
a second accelerometer mounted to said vehicle for sensing acceleration of said vehicle in a second direction and generating a second analog signal which is characteristically variable according to said sensed acceleration of said vehicle in said second direction;
an analog division circuit for dividing said first analog signal by said second analog signal to produce an output analog signal which is characteristically variable according to a ratio of said first analog signal to said second analog signal, said division circuit comprising a high gain amplifier including an input adapted to receive a first analog signal, an output for providing an output analog signal, and a feedback loop connecting said output to said input and comprising switching means, an integrating network, and means for providing substantially identical charge and discharge time constants for said integrating network;
means for operating said switching means at a modulating frequency, said operating means including a magnetic amplifier comprising a saturable reactor having an output winding connected to energize and actuate said switching means, a gate winding, and a reset winding, means for applying a signal of said modulating frequency to said gate winding to energize the same during one half of each cycle of said modulating signal, and means for energizing said reset winding in proportion to a second analog signal during the other half of each cycle of said modulating signal, said saturable reactor being energized on one half cycle to actuate said switching means and close said loop a variable portion of each half cycle according to the amount of reset produced by said second analog signal during the preceding half cycle whereby a variable feedback factor is provided for said high gain amplifier and said output analog signal is proportional to a ratio of said first analog signal and said second analog signal;
a polarity sensing circuit responsively energized in a first mode of operation when said second analog signal is of a first polarity and in a second mode of operation when said second analog signal is of a second polarity; and
control means having said output analog signal applied thereto by said polarity sensing circuit and responsive to said output analog signal for controlling said vehicle whereby said vehicle is oriented to reduce said first analog signal to zero, said output analog signal being applied to said control means in one polarity sense when said polarity sensing circuit is energized in said first mode and in a reversed polarity sense when said polarity sensing circuit is energized in said second mode.

References Cited in the file of this patent
UNITED STATES PATENTS

| | | |
|---|---|---|
| 2,129,880 | Scherbatskoy et al. | Sept. 13, 1938 |
| 2,873,074 | Harris | Feb. 10, 1959 |
| 2,973,146 | Schmid | Feb. 28, 1961 |
| 2,979,263 | Keister | Apr. 11, 1961 |
| 3,073,554 | Kaufman | Jan. 15, 1963 |

OTHER REFERENCES

McDonnell Aircraft Corp., Techniques & Developments in the Analog Computer Field, report 4966, Serial No. 154, Nov. 15, 1956 (page 17 relied on).